Patented Mar. 11, 1952

2,589,189

UNITED STATES PATENT OFFICE 2,589,189

SILICA-ALUMINA-GROUP VIII METAL CATALYST

Frank G. Ciapetta, Llanerch Hills, and William H. Buck, Philadelphia, Pa., assignors to The Atlantic Refining Company, Philadelphia, Pa., a corporation of Pennsylvania No Drawing. Application August 17, 1949, Serial No. 110,874

4 Claims. (Cl. 252—455)

The present invention relates to catalytic compositions especially useful in the catalytic treatment of olefins at elevated temperatures, and relates more particularly to catalytic compositions for the polymerization and isomerization of normally gaseous olefins to produce gaseous or liquid polymers containing substantial amounts of isoolefins.

This application is a division of our abandoned copending application, Serial No. 670,312, filed May 16, 1946, and entitled "Polymerization of Olefins."

It has been found, in accordance with the present invention, that normally gaseous olefins may be converted into polymers containing isoolefins by contacting the normally gaseous olefins, at a temperature between 100° C. and 350° C. and at pressures below about 500 pounds per square inch, with an agent comprising silica-alumina impregnated with about 10% by weight or less of a metal hydrogenation catalyst, for a period of time sufficient to effect substantial conversion. Preferably, the conversion temperature is maintained between 200° C. and 300° C. and the pressure between atmospheric and 100 pounds per square inch, using an agent comprising from 95% to 80% of silica and from 5% to 20% of alumina, such agent carrying or being impregnated with from 1% to 5% of a metal hydrogenation catalyst such as cobalt, nickel, iron, platinum, or palladium. Quantities of metal hydrogenation catalyst as low as 0.1% are effective, although it is preferred to use from 1% to 5% by weight, based on the silica-alumina agent.

In the treatment of a gaseous olefin such as ethylene with the catalytic agents described, substantial yields of normally gaseous polymers are obtained, i. e., the butylenes, together with butanes, and minor amounts of hydrogen, ethane, propane, and the C5 and C6 hydrocarbons. Of the C4 olefin hydrocarbons, the ratio of isobutylene to n-butylene is about 2 to 1, and in most cases little or no liquid polymers are formed.

The treatment of n-butylenes, on the other hand, produces substantial amounts of liquid products, as well as isomerization of the n-butylenes to isobutylene. The liquid products are, for the most part, mixtures of C8 hydrocarbons including iso-octane and iso-octene. Since it is desirable, in most cases, to obtain high yields of iso-olefins, the treatment of the normal olefins such as ethylene and normal butylenes is carried out at pressures below 500 and preferably below 100 pounds per square inch. Pressures above 500 pounds per square inch appear to favor the formation of normal or straight chain olefin polymers, therefore relatively lower pressures are employed in accordance with this invention.

The catalytic agents utilized in the present invention may be prepared by any of the conventional methods. For example, silica gel and alumina gel may be separately prepared and then mixed in the desired proportions. Or the silica gel may be treated with an aqueous solution of an aluminum salt, and the alumina precipitated in the silica gel by the addition of a precipitant. Or the silica-alumina may be prepared by first forming an acid-stabilized silica sol and then adding an adsorptive alumina to raise the pH and cause the gelation of the mixture. Various other methods may be utilized, but in all cases it is desirable to thoroughly wash the silica-alumina mixtures to remove soluble salts, particularly alkali metal ions, and then incorporate the metal hydrogenation catalyst. In one mode of operation, the silica-alumina is dried and activated by heating at 800° F. to 1200° F., then cooling and impregnating with an aqueous solution of a salt of a hydrogenating metal. The mixture is then dried and heated to decompose the metal salt, and the resulting oxide is reduced with hydrogen at elevated temperature. The catalyst may be used in the form of granules, or may be pelleted or formed into tablets of desired size. On the other hand, the catalyst may be powdered and used in such state in accordance wtih the principles embodied in the conventional "fluid" catalytic cracking processes.

The present invention may be further illustrated by the following examples, which, however, are not to be construed as limiting the scope thereof.

A commercial grade of silica-alumina cracking catalyst (85% $SiO_2$—15% $Al_2O_3$) was activated by heating for 1 hour at 500° C. The activated material was then cooled and divided into portions, to each of which was added an aqueous solution of a hydrogenating metal salt, for example, the nitrate, in an amount equivalent to the desired percentage of metal in the ultimate conversion agent. The impregnated silica-alumina was then dried at 100° C. for 3 hours, and thereafter ignited in a stream of hydrogen at 350° C. until the metal oxide was reduced to the metal. The conversion agent comprising activated silica-alumina uniformly impregnated with a hydrogenating metal catalyst was cooled and charged into a tubular reaction vessel, and the hydrocarbon to be converted was passed through the bed of conversion agent, the latter being maintained at the desired elevated temperature by means of a heating jacket surrounding the reaction vessel. The operating conditions and the results obtained are given in the following table, all of the yields being upon the once-through basis.

| Hydrocarbon Charged | Ethylene | Ethylene | Ethylene | Ethylene | Butene-1 |
|---|---|---|---|---|---|
| Catalyst on SiO₂-Al₂O₃ | 1% Co | 5% Co | 1% Ni | 5% Ni | 5% Co |
| Reaction Temp. °C | 300 | 300 | 200 | 300 | 250 |
| Reaction Pressure | Atms. | Atms. | Atms. | Atms. | Atms. |
| Space Velocity | 17 | 18 | 19 | 18 | 19 |
| Percent Conversion based on Gaseous Product to: | | | | | |
| CH₄ | 0 | 0 | 0 | 5 | 2 |
| C₂H₄ | 67 | 69 | 52 | 10 | 0 |
| C₂H₆ | 2 | 1 | 6 | 31 | 1 |
| C₃H₆ | 0 | 0 | 0 | 2 | 0 |
| C₃H₈ | 1 | 1 | 0 | 3 | 1 |
| i-C₄H₈ | 5 | 9 | 10 | 8 | .9 |
| n-C₄H₈ | 3 | 5 | 6 | 4 | 52 |
| i-C₄H₁₀ | 9 | 5 | 11 | 16 | 20 |
| n-C₄H₁₀ | 1 | 1 | 1 | 5 | 5 |
| C₅H₁₀ | 2 | 3 | 2 | 3 | 2 |
| i-C₅H₁₂ | 4 | 2 | 6 | 9 | 7 |
| n-C₅H₁₂ | 1 | 0 | 0 | 0 | 0 |
| C₆H₁₂ | 1 | 2 | 1 | 1 | 0 |
| C₆H₁₄ | 4 | 2 | 5 | 5 | 1 |
| Mol. percent H₂ in gaseous Product | | | 2 | 10 | 26 |
| Liquid Product—Weight percent of Charge | 0 | 0 | 6 | 14 | 34 |

From the above data, it will be seen that substantial yields of olefin polymers, and their isomerization and hydrogenation products may be obtained in accordance with the present invention. With separation of the products from the unconverted olefins, and recycling of the latter, high ultimate yields may be obtained.

We claim:

1. A catalyst composition consisting essentially of a synthetic silica alumina agent ranging between 80%–95% silica gel and 5%–20% of alumina, impregnated with 0.1%–10% by weight of a metal of Group VIII of the periodic system.

2. A catalyst composition consisting essentially of a synthetic silica alumina agent ranging between 80%–95% silica gel and 5%–20% of alumina, impregnated with 0.1%–10% by weight of cobalt.

3. A catalyst composition consisting essentially of a synthetic silica alumina agent ranging between 80%–95% silica gel and 5%–20% of alumina, impregnated with 0.1%–10% by weight of nickel.

4. A catalyst composition consisting essentially of a synthetic silica alumina agent ranging between 80%–95% silica gel and 5%–20% of alumina, impregnated with 0.1%–10% by weight of platinum.

FRANK G. CIAPETTA.
WILLIAM H. BUCK.

REFERENCES CITED

The following references are of record in the file of this patent:

UNITED STATES PATENTS

| Number | Name | Date |
|---|---|---|
| 1,256,032 | Mittasch et al. | Feb. 12, 1918 |
| 2,215,305 | Voorhies | Sept. 17, 1940 |
| 2,380,358 | Anderson | July 10, 1945 |
| 2,452,198 | Kennedy et al. | Oct. 26, 1948 |
| 2,461,069 | Marisic et al. | Feb. 8, 1949 |
| 2,495,700 | Corson et al. | Jan. 31, 1950 |
| 2,500,197 | Michael et al. | Mar. 14, 1950 |